United States Patent
Bryll

(10) Patent No.: US 9,726,876 B2
(45) Date of Patent: Aug. 8, 2017

(54) MACHINE VISION INSPECTION SYSTEM AND METHOD FOR OBTAINING AN IMAGE WITH AN EXTENDED DEPTH OF FIELD

(71) Applicant: Mitutoyo Corporation, Kawasaki-shi, Kanagawa-ken (JP)

(72) Inventor: Robert Kamil Bryll, Bothell, WA (US)

(73) Assignee: Mitutoyo Corporation, Kawasaki-shi, Kanagawa-ken (JP)

( * ) Notice: Subject to any disclaimer, the term of this patent is extended or adjusted under 35 U.S.C. 154(b) by 779 days.

(21) Appl. No.: 14/092,862

(22) Filed: Nov. 27, 2013

(65) Prior Publication Data

US 2015/0145980 A1    May 28, 2015

(51) Int. Cl.
  *G02B 21/00* (2006.01)
  *G02B 21/36* (2006.01)
  (Continued)

(52) U.S. Cl.
  CPC ......... *G02B 21/367* (2013.01); *G02B 21/241* (2013.01); *G02B 27/0075* (2013.01); *G02B 21/361* (2013.01)

(58) Field of Classification Search
  CPC .................................................. G02B 21/367
  (Continued)

(56) References Cited

U.S. PATENT DOCUMENTS

| 5,770,847 | A | * | 6/1998 | Olmstead | ........... | G06K 7/10702 235/454 |
| 6,542,180 | B1 | | 4/2003 | Wasserman | | |

(Continued)

FOREIGN PATENT DOCUMENTS

| JP | 02103852 | A | * | 4/1990 |
| JP | 02167513 | A | * | 6/1990 |
| JP | 2004029685 | A | * | 1/2004 |

OTHER PUBLICATIONS

Nagahara, H. et al., "Flexible Depth of Field Photography," in "Computer Vision—ECCV 2008: Proceedings of the 10th European Conference on Computer Vision, Part IV, Marseille, France, Oct. 12-18, 2008," Series: "Lecture Notes in Computer Science," 2008, vol. 5305, pp. 60-73.*

(Continued)

*Primary Examiner* — Dave Czekaj
*Assistant Examiner* — Shanika Brumfield
(74) *Attorney, Agent, or Firm* — Christensen O'Connor Johnson Kindness PLLC

(57) ABSTRACT

A method for operating an imaging system of a machine vision inspection system to provide an extended depth of field (EDOF) image. The method comprises (a) placing a workpiece in a field of view; (b) periodically modulating a focus position of the imaging system without macroscopically adjusting the spacing between elements in the imaging system, the focus position is periodically modulated over a plurality of positions along a focus axis direction in a focus range including a workpiece surface height; (c) exposing a first preliminary image during an image integration time while modulating the focus position in the focus range; and (d) processing the first preliminary image to remove blurred image contributions occurring in the focus range during the image integration time to provide an EDOF image that is focused throughout a larger depth of field than the imaging system provides at a single focal position.

17 Claims, 7 Drawing Sheets

(51) Int. Cl.
*G02B 27/00* (2006.01)
*G02B 21/24* (2006.01)

(58) Field of Classification Search
USPC .......................................................... 348/79
See application file for complete search history.

(56) References Cited

U.S. PATENT DOCUMENTS

| | | | | |
|---|---|---|---|---|
| 7,324,682 | B2* | 1/2008 | Wasserman | G06T 7/0004 382/145 |
| 7,454,053 | B2 | 11/2008 | Bryll | |
| 8,111,905 | B2 | 2/2012 | Campbell | |
| 8,111,938 | B2 | 2/2012 | Bryll | |
| 9,213,175 | B2* | 12/2015 | Arnold | G02B 21/025 |
| 2006/0164736 | A1* | 7/2006 | Olmstead | G02B 9/10 359/793 |
| 2006/0171041 | A1* | 8/2006 | Olmstead | G06K 7/10702 359/738 |
| 2010/0033836 | A1* | 2/2010 | Ohtake | G02B 15/173 359/683 |
| 2013/0120550 | A1* | 5/2013 | Chen | G01N 21/17 348/79 |
| 2013/0201355 | A1* | 8/2013 | Seki | H04N 5/23212 348/207.1 |

OTHER PUBLICATIONS

Depth of Field. (Sep. 22, 2012). In Wikipedia. Retrieved Jan. 7, 2017 from https://web.archive.org/web/20120922211425/http://en.wikipedia.org/wiki/Depth_of_field.*

"Application Note: Optical Focusing in Microscopy With Optotune's Focus Tunable Lens EL-10-30," Optotune AG, Dietikon, Switzerland, Dec. 9, 2011, pp. 1-13.
Castleman, K.R., "Digital Image Processing," Prentice Hall, Upper Saddle River, N.J., 1995, pp. 390-391 and 574-575.
Cossairt, O., et al., "Diffusion Coded Photography for Extended Depth of Field," ACM Transactions on Graphics (TOG), 29(4), Jul. 2010, 10 pages (also Proceedings of ACM SIGGRAPH).
Duocastella, M., et al., "Simultaneous Imaging of Multiple Focal Planes for Three-Dimensional Microscopy Using Ultra-High-Speed Adaptive Optics," Journal of Biomedical Optics 17(5):050505-1-050505-3, May 2012.
"Instruction Manual: scanCONTROL 2800/2810," Micro-Epsilon Messtechnik GmbH & Co. KG, Ortenburg, Germany, 2008, 44 pages.
Mermillod-Blondin, A., et al., "High-Speed Varifocal Imaging With a Tunable Acoustic Gradient Index of Refraction Lens," Optics Letters 33(18):2146-2148, Sep. 2008.
Nagahara H., et al., "Flexible Depth of Field Photography," in "Computer Vision—ECCV 2008: Proceedings of the 10th European Conference on Computer Vision, Part IV, Marseille, France, Oct. 12-18, 2008," Series: "Lecture Notes in Computer Science," 2008, vol. 5305, pp. 60-73.
Olivier, N., et al., "Two-Photon Microscopy With Simultaneous Standard and Extended Depth of Field Using a Tunable Acoustic Gradient-Index Lens," Optics Letters 34(11):1684-1686, Jun. 2009.
"QVPAK 3D CNC Vision Measuring Machine: Operation Guide," Version 2.0, Manual No. 4911GB, Series No. 359, Mitutoyo Corporation & Micro Encoder Inc., Kanagawa, Japan, Sep. 1996, 86 pages.
"QVPAK 3D CNC Vision Measuring Machine: User's Guide," Version 7.1, 2d ed., Manual No. 99MCB225A, Series No. 359, Mitutoyo Corporation & Micro Encoder Inc., Kanagawa, Japan, Sep. 2003, 370 pages.

* cited by examiner

MACHINE VISION INSPECTION SYSTEM AND METHOD FOR OBTAINING AN IMAGE WITH AN EXTENDED DEPTH OF FIELD

FIELD

The invention relates generally to machine vision inspection systems, and more particularly to extended depth-of-field imaging operations.

BACKGROUND

Precision machine vision inspection systems (or "vision systems" for short) are used to obtain precise dimensional measurements of objects and to inspect various other object characteristics. Such systems may include a computer, a camera and optical system, and a precision stage that moves to allow workpiece traversal and inspection. One exemplary prior art system, characterized as a general-purpose "off-line" precision vision system, is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, and the QVPAK 3D CNC Vision Measuring Machine Operation Guide, published September 1996, each of which is hereby incorporated by reference in their entirety. This type of system uses a microscope-type optical system and moves the stage so as to provide inspection images of either small or relatively large workpieces at various magnifications.

General-purpose precision machine vision inspection systems are generally programmable to provide automated video inspection. Such systems typically include GUI features and predefined image analysis "video tools" such that operation and programming can be performed by "non-expert" operators. For example, U.S. Pat. No. 6,542,180, which is incorporated herein by reference in its entirety, teaches a vision system that uses automated video inspection including the use of various video tools.

The machine control instructions including the specific inspection event sequence (i.e., how to acquire each image and how to analyze/inspect each acquired image) are generally stored as a "part program" or "workpiece program" that is specific to the particular workpiece configuration. For example, a part program defines how to acquire each image, such as how to position the camera relative to the workpiece, at what lighting level, at what magnification level, etc. Further, the part program defines how to analyze/inspect an acquired image, for example, by using one or more video tools such as autofocus video tools.

Video tools (or "tools" for short) and other graphical user interface features may be used manually to accomplish manual inspection and/or machine control operations (in "manual mode"). Their set-up parameters and operation can also be recorded during learn mode, in order to create automatic inspection programs, or "part programs." Video tools may include, for example, edge-/boundary-detection tools, autofocus tools, shape- or pattern-matching tools, dimension-measuring tools, and the like.

In some applications, it is desirable to operate an imaging system of a machine vision inspection system to collect an image with an extended depth of field (EDOF), such that the depth of field is larger than that provided by the optical imaging system at a single focus position. Various methods are known for collecting an image with an extended depth of field. One such method is to collect an image "stack," consisting of a plurality of congruent or aligned images focused at different distances throughout a focus range. A mosaic image of the field of view is constructed from the image stack, wherein each portion of the field of view is extracted from the particular image that shows that portion with the best focus. However, this method is relatively slow. As another example, Nagahara et al. ("Flexible Depth of Field Photography." Proceedings of the European Conference on Computer Vision, October 2008.) discloses a method wherein a single image is exposed along a plurality of focus distances during its exposure time. This image is relatively blurry, but contains image information acquired over the plurality of focus distances. It is deconvolved using a known or predetermined blur kernel to obtain a relatively clear image with an extended depth of field. In the method described in Nagahara, the focal distance is altered by translating the image detector along an optical axis of an imaging system. As a result, different focal planes are focused on the detector at different times during exposure. However, such a method is relatively slow and mechanically complex. Furthermore, altering the detector position may have detrimental effects on repeatability and/or accuracy when it is used for acquiring fixed focus inspection images, which must be used for precision measurements (e.g., for accuracies on the order of a few micrometers) and the like. An improved method for providing an extended depth of field (EDOF) image is desirable, which may be performed at high speed without relying on mechanical translation of optical components.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
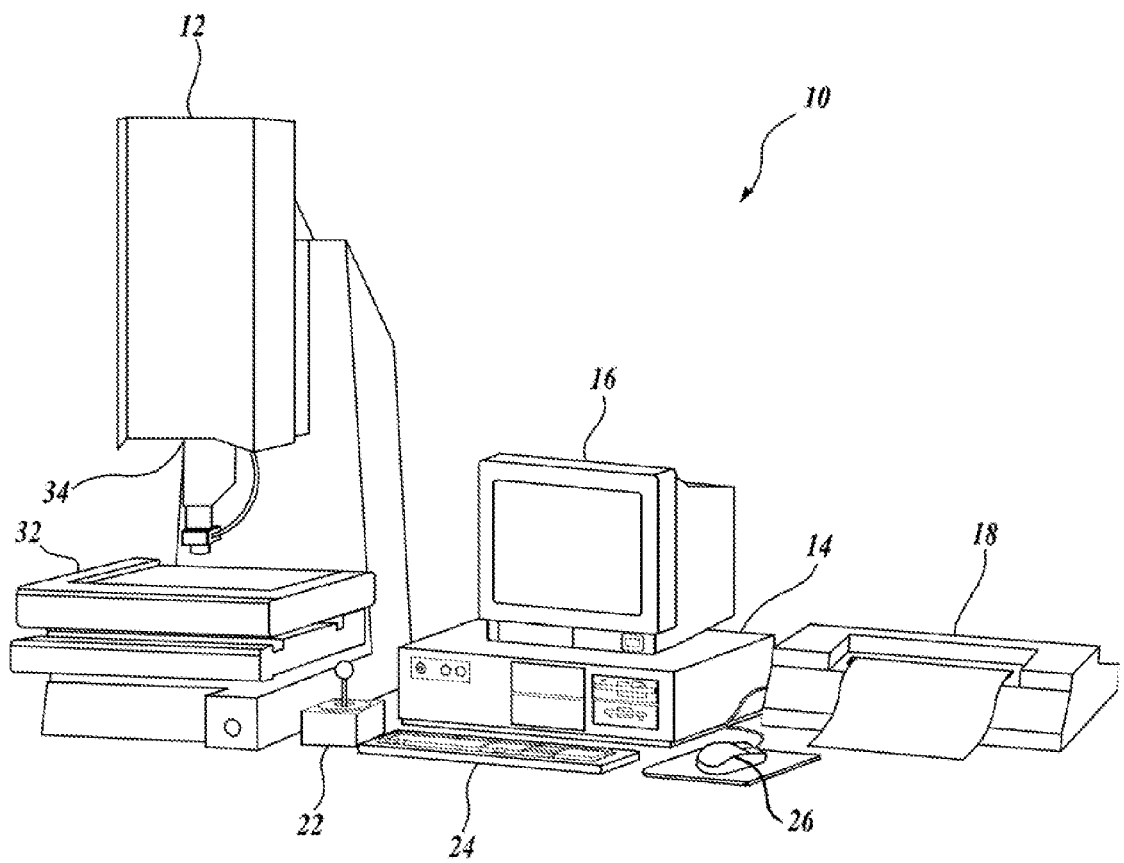
FIG. 1 is a diagram showing various typical components of a general-purpose precision machine vision inspection system.

FIG. 1 is a block diagram of one exemplary machine vision inspection system 10 usable in accordance with methods described herein. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10. It will be appreciated that in various embodiments, a touchscreen tablet or the like may be substituted for and/or redundantly provide the functions of any or all of the computer system 14, the display 16, the joystick 22, the keyboard 24, and the mouse 26.

Those skilled in the art will appreciate that the controlling computer system 14 may generally consist of any computing system or device. Suitable computing systems or devices may include personal computers, server computers, mini-computers, mainframe computers, distributed computing environments that include any of the foregoing, and the like. Such computing systems or devices may include one or more processors that execute software to perform the functions described herein. Processors include programmable general-purpose or special-purpose microprocessors, programmable controllers, application-specific integrated circuits (ASICs), programmable logic devices (PLDs), or the like, or a combination of such devices. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The vision measuring machine 12 includes a moveable workpiece stage 32 and an optical imaging system 34 that may include a zoom lens or interchangeable lenses. The zoom lens or interchangeable lenses generally provide various magnifications for the images provided by the optical imaging system 34. The machine vision inspection system 10 is also described in commonly assigned U.S. Pat. Nos. 7,454,053; 7,324,682; 8,111,905; and 8,111,938, each of which is incorporated herein by reference in its entirety.

Figure 2:
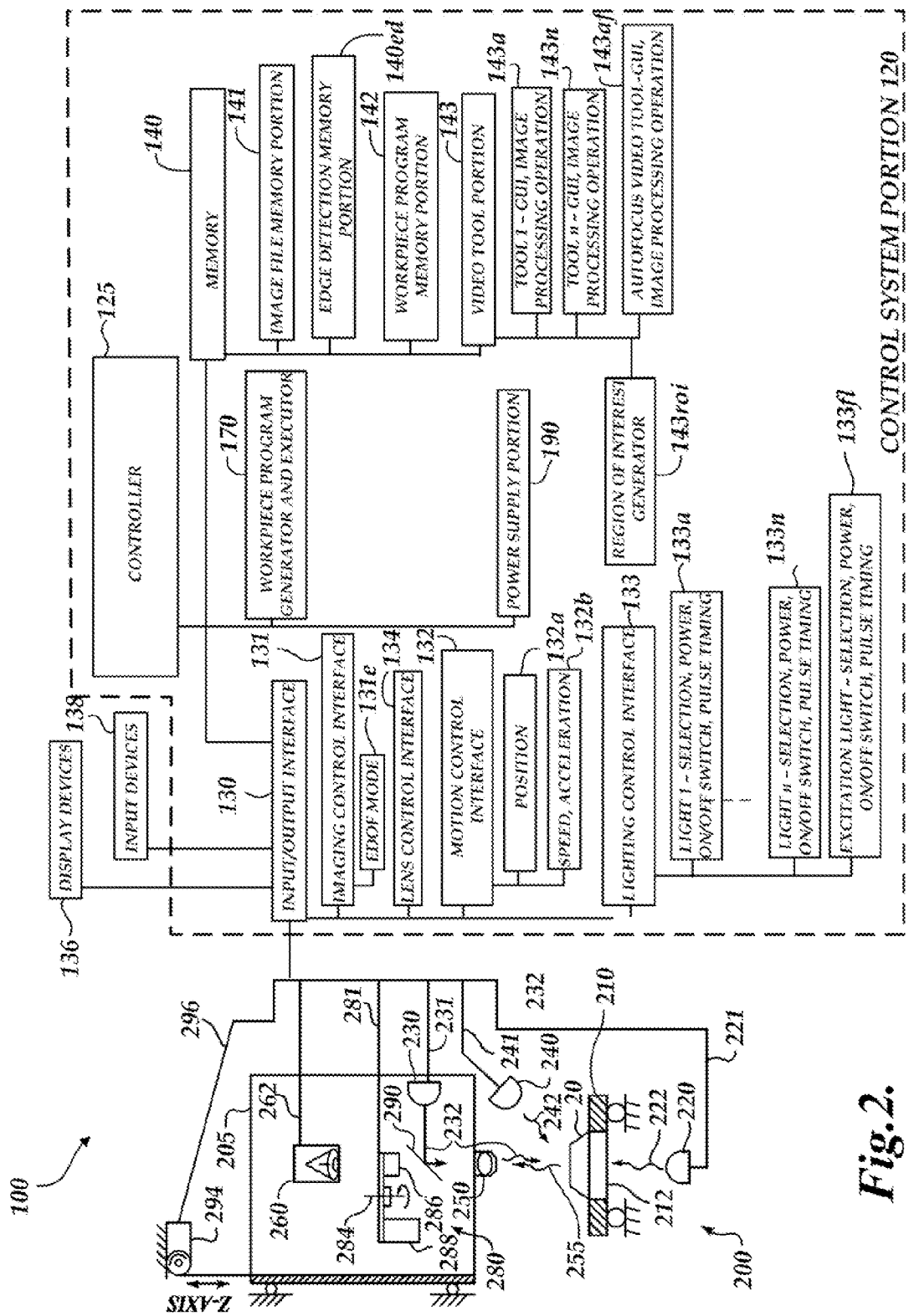
FIG. 2 is a block diagram of a control system portion and a vision components portion of a machine vision inspection system similar to that of FIG. 1 and including features disclosed herein.

FIG. 2 is a block diagram of a control system portion 120 and a vision components portion 200 of a machine vision inspection system 100 similar to the machine vision inspection system of FIG. 1, and including features as described herein. As will be described in more detail below, the control system portion 120 is utilized to control the vision components portion 200. The vision components portion 200 includes an optical assembly portion 205, light sources 220, 230, and 240, and a workpiece stage 210 having a central transparent portion 212. The workpiece stage 210 is controllably movable along X and Y axes that lie in a plane that is generally parallel to the surface of the stage where a workpiece 20 may be positioned. The optical assembly portion 205 includes a camera system 260, an interchangeable objective lens 250, and may include a turret lens assembly 280 having lenses 286 and 288. Alternatively to the turret lens assembly, a fixed or manually interchangeable magnification-altering lens, or a zoom lens configuration, or the like, may be included.

The optical assembly portion 205 is controllably movable along a Z axis that is generally orthogonal to the X and Y axes by using a controllable motor 294 that drives an actuator to move the optical assembly portion 205 along the Z axis to change the focus of the image of the workpiece 20. The controllable motor 294 is connected to an input/output interface 130 via a signal line 296.

A workpiece 20, or a tray or fixture holding a plurality of workpieces 20, which is to be imaged using the machine vision inspection system 100 is placed on the workpiece stage 210. The workpiece stage 210 may be controlled to move relative to the optical assembly portion 205, such that the interchangeable objective lens 250 moves between locations on a workpiece 20, and/or among a plurality of workpieces 20. One or more of a stage light 220, a coaxial light 230, and a surface light 240 (e.g., a ring light) may emit source light 222, 232, and/or 242, respectively, to illuminate the workpiece or workpieces 20. The light source 230 may emit light 232 along a path including a mirror 290. The source light is reflected or transmitted as workpiece light 255, and the workpiece light used for imaging passes through the interchangeable objective lens 250 and the turret lens assembly 280 and is gathered by the camera system 260. The image of the workpiece(s) 20, captured by the camera system 260, is output on a signal line 262 to the control system portion 120. The light sources 220, 230, and 240 may be connected to the control system portion 120 through signal lines or busses 221, 231, and 241, respectively. To alter the image magnification, the control system portion 120 may rotate the turret lens assembly 280 along axis 284 to select a turret lens through a signal line or bus 281.

As shown in FIG. 2, in various exemplary embodiments, the control system portion 120 includes a controller 125, the input/output interface 130, a memory 140, a workpiece program generator and executor 170, and a power supply portion 190. Each of these components, as well as the additional components described below, may be interconnected by one or more data/control busses and/or application programming interfaces, or by direct connections between the various elements.

The input/output interface 130 includes an imaging control interface 131, a motion control interface 132, a lighting control interface 133, and a lens control interface 134. The imaging control interface 131 may include an extended depth of field (EDOF) mode 131e, which a user may select to collect at least one image of a workpiece with a depth of field that is greater than what may be provided by the vision components portion 200 when focused at a single focus position. The lens control interface 134 may comprise an EDOF lens controller including a lens focus driving circuit and/or routine, or the like. The operations and components associated with an extended depth of field mode and an EDOF lens control interface and/or controller are described further below with reference to FIGS. 3-7. The motion control interface 132 may include a position control element 132a, and a speed/acceleration control element 132b although such elements may be merged and/or indistinguishable. The lighting control interface 133 includes lighting control elements 133a, 133n, and 133fl that control, for example, the selection, power, on/off switch, and strobe pulse timing, if applicable, for the various corresponding light sources of the machine vision inspection system 100.

The memory 140 may include an image file memory portion 141, an edge-detection memory portion 140ed, a workpiece program memory portion 142 that may include one or more part programs, or the like, and a video tool portion 143. The video tool portion 143 includes video tool portion 143a and other video tool portions (e.g., 143n) that determine the GUI, image-processing operation, etc., for each of the corresponding video tools, and a region of interest (ROI) generator 143roi that supports automatic, semi-automatic, and/or manual operations that define various ROIs that are operable in various video tools included in the video tool portion 143. The video tool portion also includes an autofocus video tool 143af that determines the GUI, image-processing operation, etc., for focus height measurement operations. In the context of this disclosure, and as known by one of ordinary skill in the art, the term "video tool" generally refers to a relatively complex set of automatic or programmed operations that a machine vision user can implement through a relatively simple user interface (e.g., a graphical user interface, editable parameter windows, menus, and the like), without creating the step-by-step sequence of operations included in the video tool or resorting to a generalized text-based programming language, or the like. For example, a video tool may include a complex pre-programmed set of image-processing operations and computations that are applied and customized in a particular instance by adjusting a few variables or parameters that govern the operations and computations. In addition to the underlying operations and computations, the video tool comprises the user interface that allows the user to adjust those parameters for a particular instance of the video tool. For example, many machine vision video tools allow a user to configure a graphical region of interest (ROI) indicator through simple "handle dragging" operations using a mouse, in order to define the location parameters of a subset of an image that is to be analyzed by the image-processing operations of a particular instance of a video tool. It should be noted that the visible user interface features are sometimes referred to as the video tool with the underlying operations being included implicitly.

The signal lines or busses 221, 231, and 241 of the stage light 220, the coaxial lights 230 and 230', and the surface light 240, respectively, are all connected to the input/output interface 130. The signal line 262 from the camera system 260 and the signal line 296 from the controllable motor 294 are connected to the input/output interface 130. In addition to carrying image data, the signal line 262 may carry a signal from the controller 125 that initiates image acquisition.

One or more display devices 136 (e.g., the display 16 of FIG. 1) and one or more input devices 138 (e.g., the joystick 22, keyboard 24, and mouse 26 of FIG. 1) can also be connected to the input/output interface 130. The display devices 136 and input devices 138 can be used to display a user interface that may include various graphical user interface (GUI) features that are usable to perform inspection operations, and/or to create and/or modify part programs, to view the images captured by the camera system 260, and/or to directly control the vision system components portion 200. The display devices 136 may display user interface features associated with the autofocus video tool 143af.

In various exemplary embodiments, when a user utilizes the machine vision inspection system 100 to create a part program for the workpiece 20, the user generates part program instructions by operating the machine vision inspection system 100 in a learn mode to provide a desired image-acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one of the video tools on that workpiece feature). The learn mode operates such that the sequence(s) are captured or recorded and converted to corresponding part program instructions. These instructions, when the part program is executed, will cause the machine vision inspection system to reproduce the trained image acquisition and cause inspection operations to automatically inspect that particular workpiece feature (that is the corresponding feature in the corresponding location) on a run mode workpiece, or workpieces, which matches the representative workpiece used when creating the part program. The systems and methods disclosed herein are particularly useful during such learn mode and/or manual operations, in that a user may see an EDOF video image in real time while navigating a workpiece for visual inspection and/or workpiece program creation. The user need not continually refocus high-magnification images depending on the height of various microscopic features on the workpiece, which can be tedious and time-consuming, especially at high magnifications.

Figure 3:
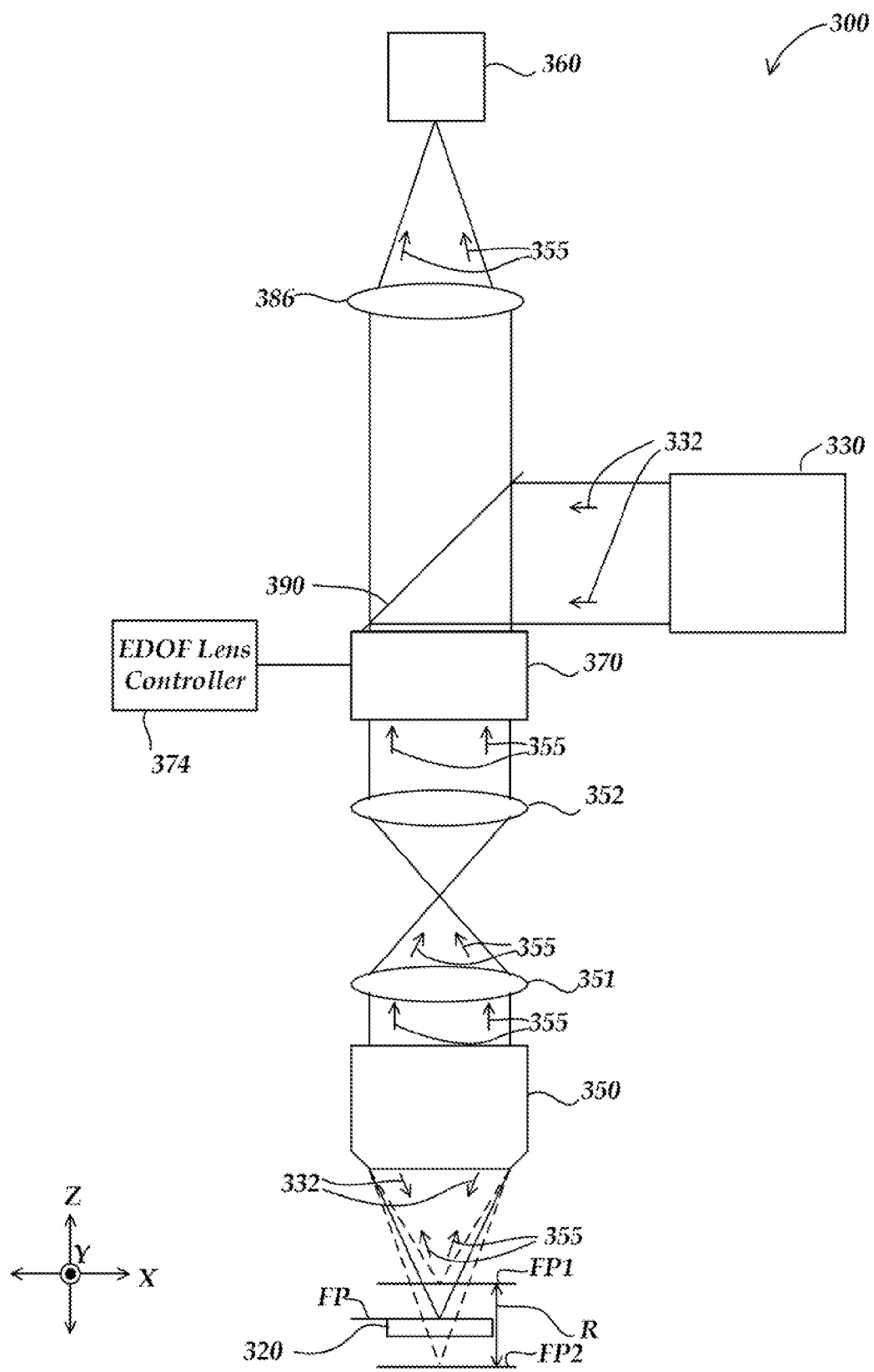
FIG. 3 shows a schematic diagram of a first embodiment of an EDOF imaging system that may be adapted to a machine vision inspection system and operated according to the principles disclosed herein.

FIG. 3 shows a schematic diagram of a first embodiment of an EDOF imaging system 300 that may be adapted to a machine vision inspection system and operated according to the principles disclosed herein. The imaging system 300 is configurable to provide at least one image of a workpiece that has a larger depth of field than the imaging system in a single focal position (e.g., 10-20 times larger, or more, in various embodiments). The imaging system 300 comprises a light source 330 that is configurable to illuminate a workpiece in a field of view of the imaging system 300, an objective lens 350, a relay lens 351, a relay lens 352, a variable focal length lens 370, a tube lens 386, and a camera system 360.

In operation, the light source 330 is configurable to emit source light 332 along a path including a mirror 390 to a surface of a workpiece 320, the objective lens 350 receives workpiece light 332 including workpiece light that is focused at a focus position FP proximate to the workpiece 320, and outputs the workpiece light 355 to the relay lens 351. The relay lens 351 receives the workpiece light 355 and outputs it to the relay lens 352. The relay lens 352 receives the workpiece light 355 and outputs it to the variable focal length lens 370. Together, the relay lens 351 and the relay lens 352 provide a 4f optical relay between the objective lens 350 and the variable focal length lens 370 in order to provide constant magnification for each Z height of the workpiece 320 and/or focus position FP. The variable focal length lens 370 receives the workpiece light 355 and outputs it to the tube lens 386. The variable focal length lens 370 is electronically controllable to vary the focus position FP of the imaging system during one or more image exposures. The focus position FP may be moved within a range R bound by a focus position FP1 and a focus position FP2. It should be appreciated that in some embodiments, the range R may be selected by a user, e.g., in the EDOF mode 131e of the imaging control interface 131.

In various embodiments, a machine vision inspection system comprises a control system (e.g., the control system 120) that is configurable to control the variable focal length lens 370 to periodically modulate a focus position of the imaging system 300. In some embodiments, the variable focal length lens 370 may very rapidly adjust or modulate the focus position (e.g., periodically, at a rate of at least 300 Hz, or 3 kHz, or much higher). In some embodiments, the range R may be as large as 10 mm (for a 1× objective lens 350). In various embodiments, the variable focal length lens 370 is advantageously chosen such that it does not require any macroscopic mechanical adjustments imaging system and/or adjustment of the distance between the objective lens 350 and the workpiece 320 in order to change the focus position FP. In such case, the EDOF image may be provided at a high rate, and furthermore there are no macroscopic adjustment elements nor associated positioning non-repeatability to degrade accuracy when the same imaging system is used for acquiring fixed focus inspection images, which must be used for precision measurements (e.g., for accuracies on the order of a few micrometers) and the like. For example, in some embodiments it is desirable to use the EDOF image as a display image for a user, and later terminate the periodic modulating of the focus position (e.g., using the previously described EDOF mode control element 131e, or automatic termination based on an active measurement operation, or the like) to provide a fixed focus position for the imaging system. Then the system may be used to expose a measurement image of a particular feature using the imaging system with the fixed focus position; and that stable high-resolution measurement image may be processed to provide an accurate measurement of the workpiece.

In some embodiments, the variable focal length lens 370 is a tunable acoustic gradient index of refraction lens. A tunable acoustic gradient index of refraction lens is a high-speed variable focal length lens that uses sound waves in a fluid medium to modulate a focus position and may periodically sweep a range of focal lengths at a frequency of several hundred kHz. Such a lens may be understood by the teachings of the article, "High-speed varifocal imaging with a tunable acoustic gradient index of refraction lens" (Optics Letters, Vol. 33, No. 18, Sep. 15, 2008), which is hereby incorporated by reference in its entirety. Tunable acoustic gradient index lenses and related controllable signal generators are available, for example, from TAG Optics, Inc., of Princeton, N.J. The SR38 series lenses, for example, are capable of modulation up to 1.0 MHz.

The variable focal length lens 370 may be driven by an EDOF lens controller 374, which may generate a signal to control the variable focal length lens 370. In one embodiment, the EDOF lens controller 374 may be a commercial controllable signal generators such as that referred to above. In some embodiments, the EDOF lens controller 374 may be configured or controlled by a user and/or an operating program through the imaging control interface 131 and/or a user interface of the EDOF mode 131e and/or the lens control interface 134, outlined previously with reference to FIG. 2. In some embodiments, the variable focal length lens 370 may be driven using a periodic signal such that the focus position FP is modulated sinusoidally over time, at a high frequency. For example, in some exemplary embodiments, a tunable acoustic gradient index of refraction lens may be configured for focal scanning rates as high as 400 kHz, although it should be appreciated that slower focus position adjustments and/or modulation frequencies may be desirable in various embodiments and/or applications. For example, in various embodiments a periodic modulation of 300 Hz, or 3 kHz, or the like may be used. In embodiments where such slower focus position adjustments are used, the variable focal length lens 370 may comprise controllable fluid lens, or the like.

The embodiment of an EDOF imaging system shown in FIG. 3, is usable when an EDOF imaging system and associated signal processing is configured to perform computational deconvolution of a preliminary image from an EDOF imaging system and provide a relatively clear EDOF image approximately in real time. For example, a control system (e.g., the control system portion 120 shown in FIG. 2) is configured to collect a first preliminary image during the course of at least one sweep of the modulated focus position throughout an EDOF focus range during the image exposure, and process the first preliminary image which, may be blurry, to determine a relatively clear image. In one embodiment, the preliminary image may be processed or deconvolved using a known or predetermined point spread function (PSF) corresponding to the focus range of the preliminary image. A point spread function P(FP) characterizes a blur circle, i.e., a circular image of a point light source at a given distance from an imaging system as a function of a radius r of the blur circle and the focus position FP. A point spread function may be determined experimentally for an imaging system (e.g., the imaging system 300) or it may be estimated using point spread functions modeled on functions such as a pill box or a Gaussian curve, or using basic diffraction principles, e.g., Fourier optics, according to known methods. Such point spread functions at various focus distances within a focus range may be weighted according to their expected exposure contributions or applicability. For example, when the focus distance moves during an exposure, each focus distance will contribute to an image exposure for a corresponding time period within that exposure, and a point spread function corresponding to that distance may be weighted accordingly. Such weighted point spread function contributions may be summed or integrated over an expected focus range R. Alternatively, when the focus distance change is a known function of time, such point spread function contributions may be integrated over a period of time corresponding to a sweep of the expected focus range R, analogous to the approach indicated with reference to EQUATION 3 below.

For an imaging system with a modulated focus position, an integrated point spread function H which follows the relation:

$$h = \int_0^T P(FP(t)) dt \qquad \text{Eq. 1}$$

where P(FP(t)) is a point spread function and FP(t) is the time-dependent focal position. A focus position of an imaging system of a machine vision inspection system may be modulated as a function of time t, over a total integration time T, corresponding to an image exposure or integration time of the first preliminary image.

Deconvolution of the first preliminary image may be understood as an inverse operation that deconvolves a high depth of field image exposed over a range of focus positions having respective durations in the exposure, from an integrated point spread function h, which in some applications may be referred to as a "blur function." The first preliminary image may be represented as a two-dimensional function g(x,y) which is a convolution of an extended depth of field image f(x,y) (corresponding to an image array with dimensions m×n) with the integrated point spread function h by the equation:

$$g(x,y)=f*h=\Sigma_m\Sigma_n f(m,n)h(x-m,y-n) \quad \text{Eq. 2}$$

In the frequency domain, this convolution may be represented by the product of the Fourier transforms of f and h, represented as F and H:

$$G=F\cdot H \quad \text{Eq. 3}$$

The Fourier transforms of f and h may be determined efficiently using a fast Fourier transform (FFT) algorithm. The EDOF image (in the frequency domain) may be determined by processing the image G (i.e., multiplying it) by an inverse of H denoted here as $H_r$. The inverse $H_r$ may be computed by several known methods. For example, a simple pseudo inverse of H may be determined by the equation:

$$H_r = \frac{H^*}{|H|^2 + k} \quad \text{Eq. 4}$$

Where H* is the complex conjugate of the H, and k is a real number chosen empirically based on characteristics of the imaging system 300. In one exemplary embodiment, k is 0.0001. Finally, the extended depth of field image f may be computed as:

$$f(x,y) = g*h_r = \mathcal{F}^{-1}(G\cdot H_r) = \mathcal{F}^{-1}\left\{G\cdot \frac{H^*}{|H|^2+k}\right\} \quad \text{Eq. 5}$$

A more robust alternative to the pseudo inverse may be computed according to a Wiener Deconvolution or a Lucy-Richardson iterative algorithm, which are described in *Digital Image Processing* by Kenneth R. Castleman (Prentice-Hall, Inc., 1996). Additionally, processing the image may comprise block-based denoising.

In a different embodiment, as described in greater detail below with respect to FIGS. 5 and 6, a deconvolution may be performed optically using a passive optical filter placed in a Fourier plane of an EDOF imaging system according to basic methods of Fourier optics, in order to provide a relatively clear EDOF image in real time.

In exemplary embodiments, the imaging system 300 may provide a first preliminary image, which is a blurred image including information acquired throughout a desired focus range during its exposure. The first preliminary image may then be computationally processed as outlined above to provide an extended depth of field image that comprises a depth of field that is larger than the imaging system 300 may provide at a single focal position (e.g., 100 times larger). For example, at a single focal position, the depth of field may be 90 μm and an extended depth of field image provided using the same embodiment of the imaging system 300 may be as large as 9 mm.

Figure 4:
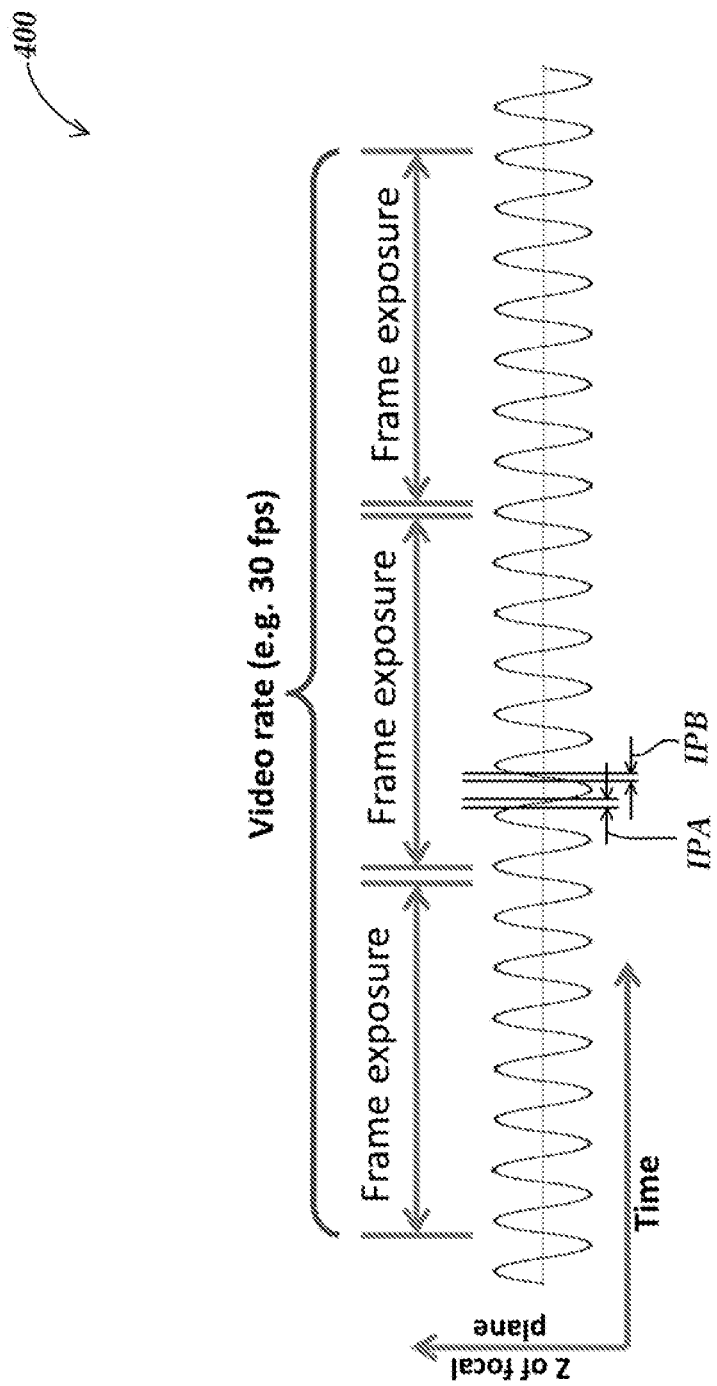
FIG. 4 shows an exemplary timing diagram for a focal height during an image exposure as may be used in one embodiment of an EDOF imaging system (e.g., the imaging system of FIG. 3) according to principles disclosed herein.

FIG. 4 shows an exemplary timing diagram 400 for a focal height during an image exposure as may be used in one embodiment of an EDOF imaging system (e.g., the imaging system 300) according to principles disclosed herein. The timing diagram 400 additionally shows exposure times of a camera of the imaging system. Generally speaking, EDOF image exposures, also referred to as frame exposures in the following description, may be performed by the imaging system over at least one sweep of the modulation of the focal height of the imaging system over a desired focus range during the exposure. In the particular example shown in the timing diagram 400, a frame exposure is performed corresponding to at least one cycle of a periodic modulation of the focal height of the imaging system over a desired focus range. High-speed periodic modulation is conveniently performed using a tunable acoustic gradient index of refraction lens. More specifically, in one embodiment the following steps reflected in FIG. 4 are repeated at least one time to provide an EDOF image that is substantially focused throughout a larger depth of field than the imaging system provides at a single focal position:

periodically modulating a focus position (focal plane) of the imaging system over a plurality of focus positions along a focus axis direction without macroscopically adjusting the spacing between elements in the imaging system, the focus position periodically modulated in a focus range including a surface height of the workpiece at a frequency of at least 300 Hz;

exposing a first preliminary image during an image integration time while modulating the focus position in the focus range; and processing the first preliminary image to remove blurred image contributions occurring during the image integration time to provide an EDOF image that is substantially focused throughout a larger depth of field than the imaging system provides at a single focal position.

It will be understood that in the description immediately above, when the blurred image contributions are computationally removed, the first preliminary image may be a blurred image that initially includes the blurred image contributions. The first preliminary image in this case comprises detected and/or recorded image data. Processing the first preliminary image to remove the blurred image contributions comprises computational processing to the first preliminary image data, to provide an EDOF image (a second or modified image) that is substantially focused throughout a larger depth of field than the imaging system provides at a single focal position. Thus, the first preliminary image and the provided EDOF image comprise different images and/or image data in this embodiment.

In contrast, when the blurred image contributions are removed using an optical filter and passive Fourier image-processing methods, the first preliminary image and the EDOF image occur simultaneously, and the first preliminary image need not be a detected or recorded image. Processing the first preliminary image to remove the blurred image contributions comprises passive optical processing to the first preliminary image light that is input to the EDOF imaging system, to provide an EDOF image at the output or detector of the EDOF imaging system that is substantially focused throughout a larger depth of field than the imaging system provides at a single focal position. Thus, it may be considered in such an embodiment that the first preliminary image is optically processed during its passage through the EDOF imaging system and prior to detection at the camera or detector of the EDOF imaging system, such that the provided EDOF image is the only detected or recorded image in such an embodiment.

Figure 5:
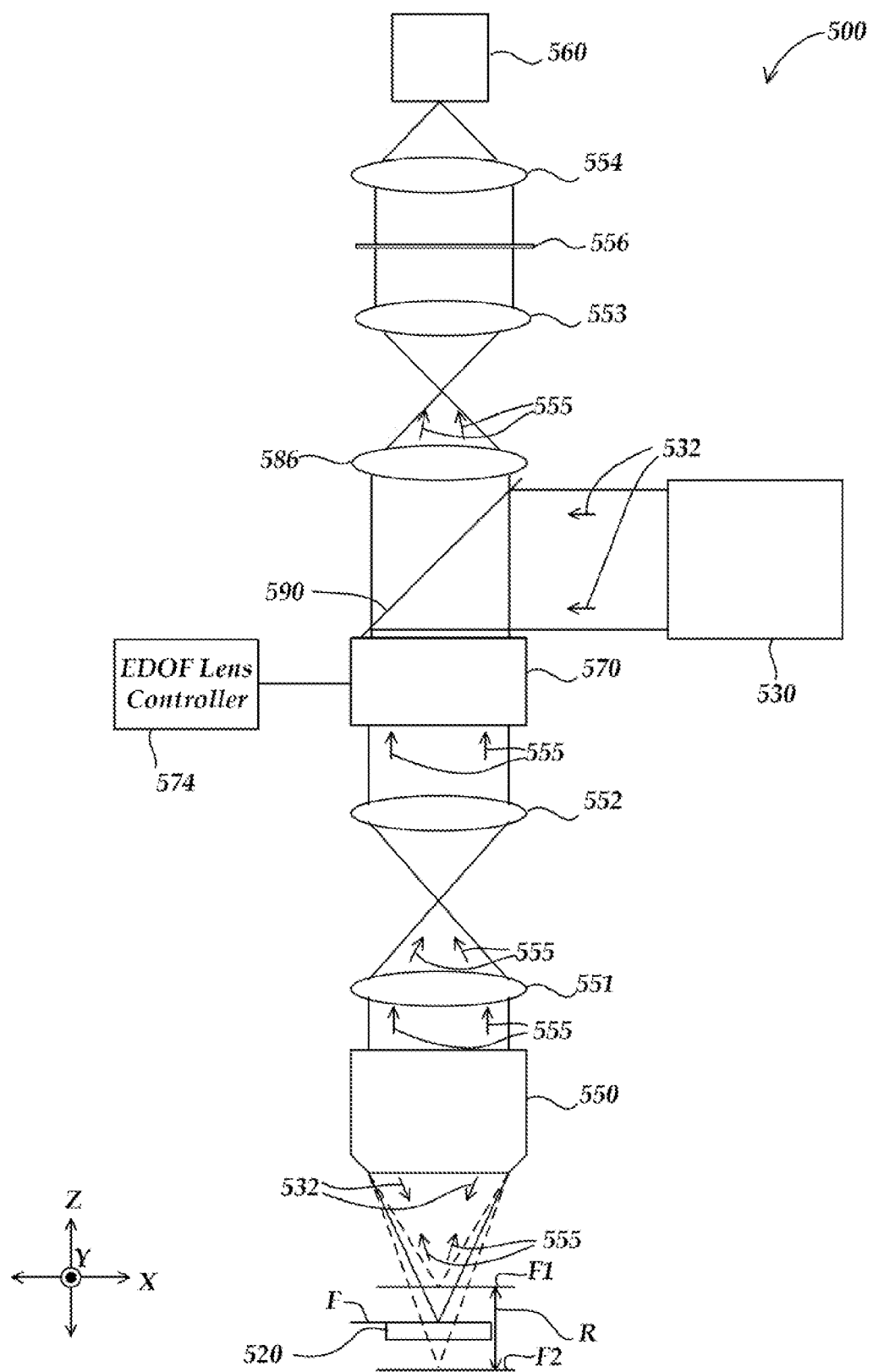
FIG. 5 shows a schematic diagram of a second embodiment of an EDOF imaging system that may be adapted to a machine vision inspection system and operated according to the principles disclosed herein.

Control for modulation of the focus position, according to any of the methods outlined herein and/or as illustrated in FIG. 4, may be accomplished as outlined with reference to the EDOF mode element 130e and the lens control interface 134 shown in FIG. 2, and/or the EDOF lens controllers 374 and 574 shown in FIG. 3 and FIG. 5, respectively.

Because an EDOF imaging system configured according to the principles disclosed herein offers high speed extended depth-of-field imaging, such an imaging system may be utilized to repetitively collect extended depth-of-field images at a high rate, e.g., for video imaging at 30 frames per second or higher, and the plurality of extended depth-of-field images may be displayed as real-time video frames.

In some embodiments it is possible make an adjustment to a control signal component related to the nominal center of the range R of the periodic modulation in response to a user input (e.g., using a user interface feature of the EDOF mode element 131e), such that the periodic modulation takes place about a desired nominal center of the range. In some embodiments, such an adjustment may even be controlled to vary automatically during an image exposure, to further extend a focus range beyond that achieved by a single periodic modulation, for example.

It should be appreciated that while the timing diagram shows 7 periods of the modulation of the focal height for each frame exposure, for purposes of illustration, in various embodiments, a machine vision inspection system configured according to the principles disclosed herein may comprise an imaging system that modulates the focal height over a much greater number of periods per frame exposure. For example, an exemplary imaging system may collect video images at 30 frames per second and may modulate the focus height at a rate of 30 kHz, which therefore provides 1,000 periods of focus height modulation per frame exposure. One advantage of such a configuration is that the timing relationship between the frame exposure in the periodic modulation is not critical. For example, Equation 1 shows that an integrated point spread function used to remove blurred image contributions depends on the focal position as a function of time throughout an image exposure. If the assumed integrated point spread function does not match the actual focal position as a function of time throughout the image exposure, then the blurred image contributions will not be treated in an ideal manner. If the assumed integrated point spread function is based on a full periodic modulation of the focus throughout the focus range, and only a single period (or a few periods) of a periodic focus modulation is used during an image exposure then, if the exposure is terminated after a non-integer number of periods, the actual integrated actual focal position may be significantly "unbalanced," in comparison to the assumed integrated point spread function. In contrast, if the accumulated number of periods is significant, e.g., at least 5 periods or preferably many more, during an image exposure then, if the exposure is terminated after a non-integer number of periods, the unbalanced contribution of the incomplete period may be relatively insignificant, and the assumed integrated point spread function will operate in a nearly ideal manner.

In some embodiments, collecting a first image during the course of at least one period of the periodically modulated focus position may comprise exposing an image during the course of an integer number of periods. Based on the foregoing discussion, it will be understood that this may be particularly valuable when an EDOF image exposure comprises relatively few periods of a periodic focus modulation (e.g., 5 or fewer periods.) For example, this might occur when an exposure time must be relatively short in order to avoid overexposure, and/or freeze motion, or the like.

In the example shown in the timing diagram 400, the focus position is modulated sinusoidally. In some embodiments, the image integration time includes a focus change over the entirety of the desired focus range (e.g., at least one period of the periodically modulated focus position, as shown in FIG. 4). In some embodiments, it may be desirable to expose an image only during the more linear portions of the sinusoidal modulation. This allows for more balanced exposure times for each height within the focus position modulation (e.g., the relatively longer focus position dwell times at the extremes of a sinusoidal focus modulation may be eliminated.) Thus, in some embodiments, exposing an image during an image integration time comprises providing illumination having an intensity variation (e.g., an on/off cycle or a more gradual intensity variation) synchronized with the periodically modulated focus position, such that it differently influences the respective exposure contributions for different respective focus positions within the range of the periodically modulated focus position. It will be appreciated that a frame exposure may receive substantially no image contribution when the strobe illumination is off. The timing diagram 400 indicates two exemplary integration periods IPA and IPB, which may be used for exposing an image. The exemplary integration periods IPA and IPB exclude the regions near the extrema of the sinusoidal modulation, i.e., both are at least 15 percent of the period length away from extrema portions of the sinusoidal modulation. The integration periods IPA and IPB may be controlled by providing a corresponding strobe illumination during a frame exposure, according to known methods.

FIG. 5 shows a schematic diagram of a second embodiment of an EDOF imaging system 500 that may be adapted to a machine vision inspection system and operated according to the principles disclosed herein. The imaging system 500 is similar to the imaging system 300 of FIG. 3. Similarly numbered elements marked 3XX in FIG. 3 and 5XX in FIG. 5 may be understood to be similar or identical and only significant differences will be described with respect to FIG. 5. The embodiment of an EDOF imaging system shown in FIG. 5 is usable when an EDOF imaging system is configured to perform passive optical deconvolution of preliminary image light in an EDOF imaging system and output a relatively clear EDOF image to a camera and/or detector of the imaging system in real time. In the embodiment shown in FIG. 5, the imaging system 500 additionally comprises a first filtering lens 553, a second filtering lens 554 and an optical deconvolution filter 556. The first filtering lens 553 and the second filtering lens 554 provide a 4f optical relay with the optical deconvolution filter 556 placed at a Fourier plane. The optical deconvolution filter 556 may be derived from an integrated point spread function determined for the imaging system 500, as described in greater detail below with reference to FIG. 6. In operation, the optical deconvolution filter 556 is configured to input preliminary image light from a variable focal length lens 570 and process that image light by optically filtering it, which provides an output EDOF image to a camera 560, which is a relatively clear EDOF image output to the camera 560 in real time.

Figure 6A:
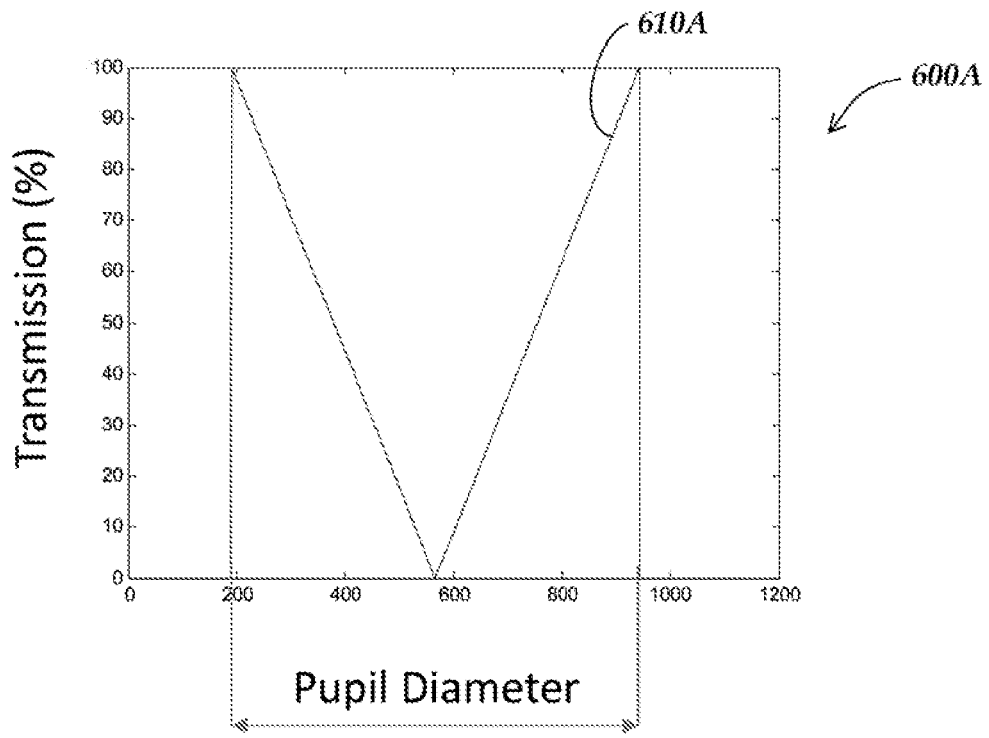
FIG. 6A is a graph characterizing a first embodiment of an optical filter which may be used at a Fourier plane of an imaging system, in order to perform optical deconvolution of an image from an EDOF imaging system and provide a relatively clear EDOF image in real time.

FIG. 6A is a graph 600A characterizing a first exemplary optical filter which may be used at a Fourier plane of an EDOF imaging system (e.g., as an embodiment of the optical deconvolution filter 556 of FIG. 5) in order to perform optical deconvolution of an image from an EDOF imaging system and provide a relatively clear EDOF image in real time. The graph shows an optical transmission curve 610A. The optical transmission curve 610A comprises a linear optical transmission profile that is, at a minimum, at the center of the optical filter. At the periphery of the optical filter near the edge of a pupil diameter, the optical transmission value is at 100 percent. Beyond the pupil diameter, the optical transmission is at zero. The optical filter characterized by the graph 600A acts as a high pass spatial filter in the process of deconvolution.

Figure 6B:
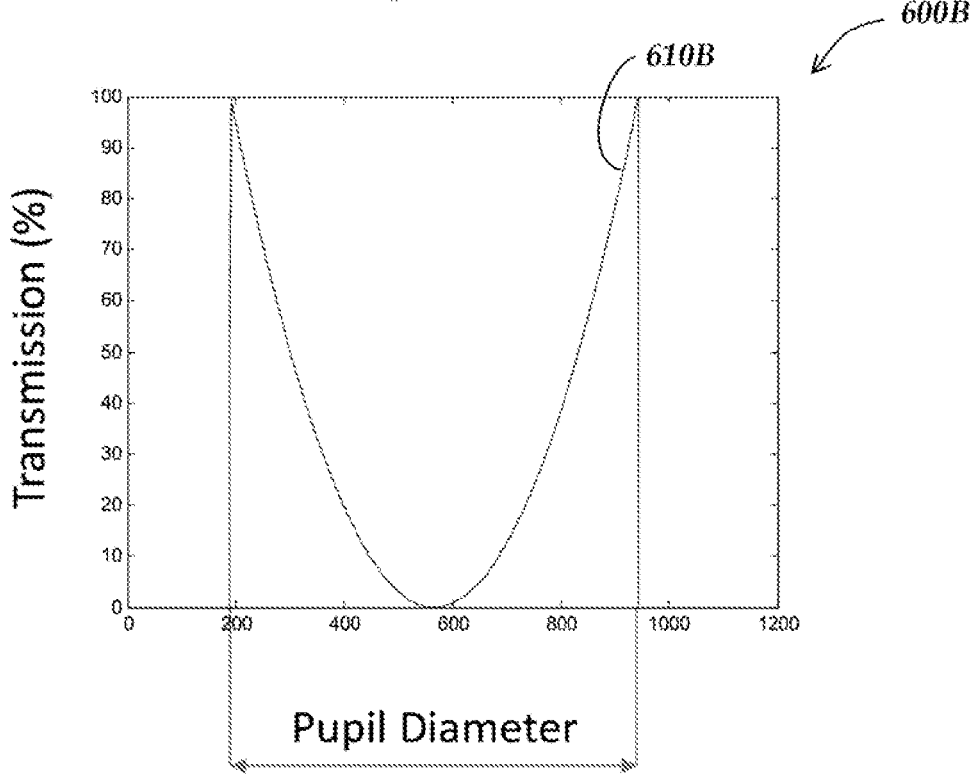
FIG. 6B is a graph characterizing a second embodiment of an optical filter which may be used at a Fourier plane of an imaging system.

FIG. 6B is a graph 600B characterizing a second exemplary optical filter that may be used at a Fourier plane of an EDOF imaging system (e.g., as an embodiment of the optical deconvolution filter 556 of FIG. 5) in order to perform optical deconvolution of an image from an EDOF imaging system and provide a relatively clear EDOF image in real time. The graph shows an optical transmission curve 610B. The optical transmission curve 610B comprises a quadratic optical transmission profile that is, at a minimum, at the center of the optical filter. At the periphery of the optical filter near the edge of a pupil diameter, the optical transmission value is at 100 percent. Beyond the pupil diameter, the optical transmission is at zero. The optical filter characterized by the graph 600B also acts as a high pass spatial filter in the process of deconvolution. It should be appreciated that the optical filters characterized by the graph 600A and the graph 600B are exemplary and not limiting, and optical filters with other transmission profiles may be used, e.g., phase-modifying filters.

Figure 7:
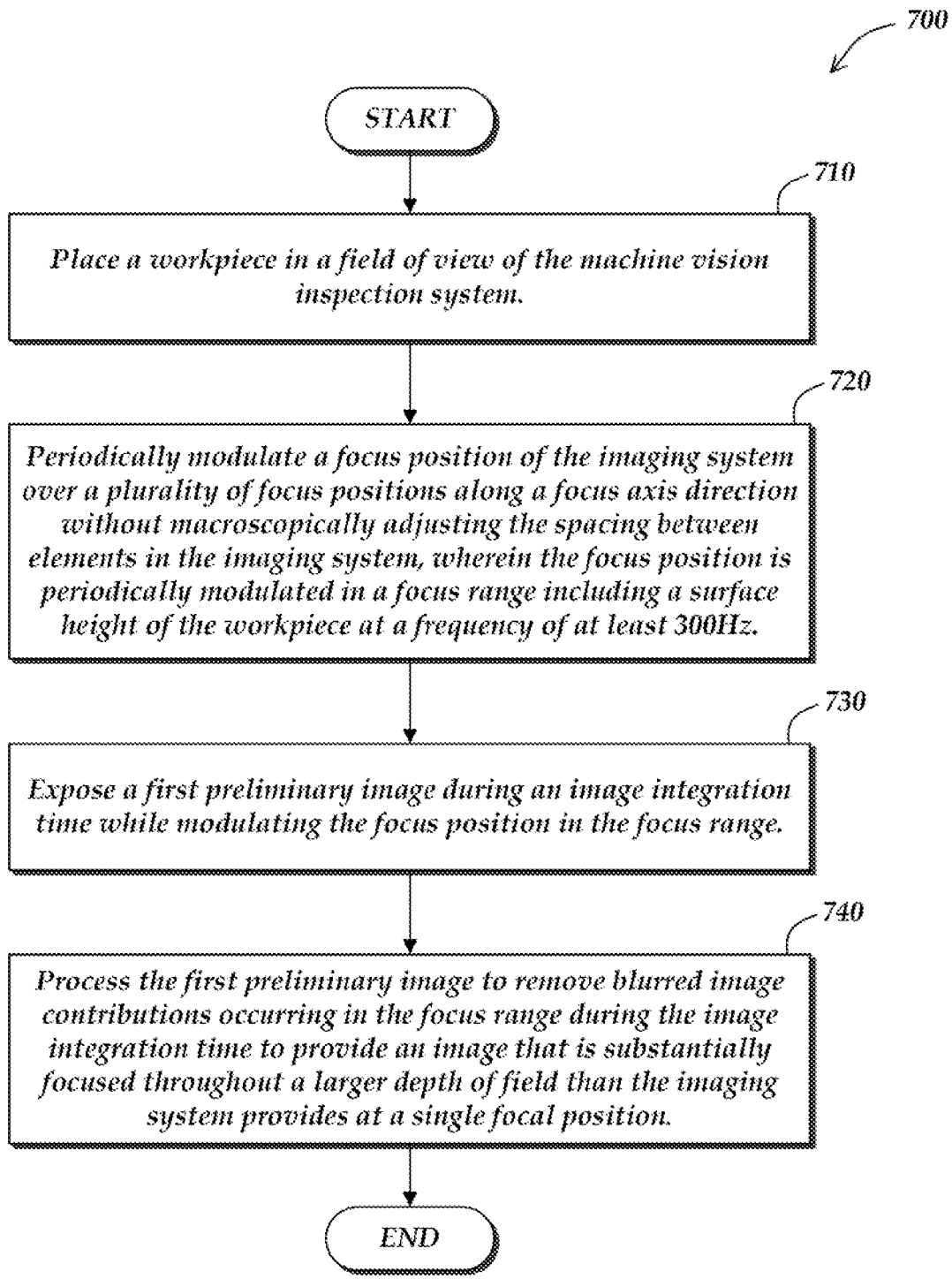
FIG. 7 is a flow diagram showing one embodiment of a method for operating an imaging system of a machine vision inspection system in order to perform computational deconvolution of a preliminary image from an EDOF imaging system and provide a relatively clear EDOF image approximately in real time.

FIG. 7 is a flow diagram 700 showing one embodiment of a method for operating an imaging system and associated signal processing of a machine vision inspection system in order to perform computational deconvolution of a preliminary image from an EDOF imaging system and provide a relatively clear EDOF image approximately in real time.

At a block 710, a workpiece is placed in a field of view of the machine vision inspection system.

At a block 720, a focus position of the imaging system is periodically modulated over a plurality of focus positions along a focus axis direction without macroscopically adjusting the spacing between elements in the imaging system. The focus position is periodically modulated in a focus range including a surface height of the workpiece at a frequency of at least 300 Hz (or a much higher frequency, in some embodiments).

At a block 730, a first preliminary image is exposed during an image integration time while modulating the focus position in the focus range.

At a block 740, data from the first preliminary image is processed to remove blurred image contributions occurring in the focus range during the image integration time to provide an image that is substantially focused throughout a larger depth of field than the imaging system provides at a single focal position.

While various embodiments of the invention have been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The invention claimed is:

1. A method for operating an imaging system of a machine vision inspection system to provide at least one image that has a larger depth of field than the imaging system in a single focal position, the method comprising:
(a) placing a workpiece in a field of view of the machine vision inspection system;
(b) periodically modulating a focal length of a variable focal length tunable acoustic gradient index of refraction (TAG) lens included in the imaging system in order to periodically modulate a focus position of the imaging system without macroscopically adjusting the spacing between elements in the imaging system, wherein the focus position is periodically modulated over a plurality of focus positions along a focus axis direction in a focus range including a surface height of the workpiece at a frequency of at least 3 kHz;
(c) exposing a first preliminary image during an image integration time while modulating the focus position in the focus range, comprising exposing the first preliminary image over an exposure duration comprising at least five periods of the periodically modulated focus position and providing illumination having an intensity variation synchronized with the periodically modulated focus position, such that it differently influences the respective exposure contributions for different respective focus positions within the focus range of the periodically modulated focus position; and
(d) processing the first preliminary image to remove blurred image contributions occurring in the focus range during the image integration time to provide an extended depth of field (EDOF) image that is substantially focused throughout a larger depth of field than the imaging system provides at a single focal position.

2. The method of claim 1, wherein processing the first preliminary image to remove blurred image contributions comprises deconvolving image data corresponding to the first preliminary image using a predetermined function that characterizes the imaging system, to provide the EDOF image.

3. The method of claim 1, wherein:
the imaging system further comprises an optical filter located to receive and spatially filter preliminary image light from the TAG lens; and
in step (d), processing the first preliminary image to remove blurred image contributions comprises spatially filtering the preliminary image light using the optical filter, to provide the EDOF image based on light output by the optical filter.

4. The method of claim 1, further comprising:
repeating steps (c) and (d) at least one time to provide a plurality of EDOF images that are substantially focused throughout a larger depth of field than the imaging system provides at a single focal position.

5. The method of claim 4, further comprising displaying at least one of the plurality of EDOF images on a display of the machine vision inspection system.

6. The method of claim 4, further comprising displaying at least some of the plurality of EDOF images as video frames on a display of the machine vision inspection system.

7. The method of claim 4, further comprising making an adjustment to a control signal component related to a nominal center of the periodic modulation based on a user input, such that at least two of the plurality of EDOF images are focused over different focus ranges.

8. The method of claim 1, further comprising:
(e) terminating the periodic modulating of the focus position to provide a fixed focus position for the imaging system;
(f) exposing a measurement image using the imaging system with the fixed focus position; and
(g) processing the measurement image to provide a measurement of the workpiece.

9. The method of claim 1, wherein exposing a first preliminary image during the image integration time further comprises exposing the first preliminary image over an exposure duration corresponding to an integer number of periods of the periodically modulated focus position.

10. The method of claim 1, wherein the intensity variation comprises an intensity on/off cycle synchronized with the periodically modulated focus position, wherein the intensity is on only during a more linear portion of the periodically modulated focus position.

11. The method of claim 10, wherein the focus position is periodically modulated over a plurality of focus positions spanning at least 20 times the depth of field than the imaging system in a single focal position.

12. A machine vision inspection system having an imaging system and configured to provide at least one image of a workpiece that has a larger depth of field than the imaging system of the machine vision inspection system in a single focal position, the machine vision inspection system comprising:

the imaging system configured such that periodically modulating a focal length of a variable focal length tunable acoustic gradient index of refraction (TAG) lens included in the imaging system periodically modulates the imaging system focus position over a plurality of focus positions along a focus axis direction in a focus range including a surface height of the workpiece at a frequency of at least 3 kHz, without macroscopically adjusting the spacing between elements in the imaging system;

a controller configured to expose a first preliminary image during an image integration time while modulating the focus position in the focus range comprising exposing the first preliminary image over an exposure duration comprising at least five periods of the periodically modulated focus position and providing illumination having an intensity variation synchronized with the periodically modulated focus position, such that it differently influences the respective exposure contributions for different respective focus positions within the focus range of the periodically modulated focus position; and a processing element configured to process the first preliminary image to remove blurred image contributions occurring in the focus range during the image integration time to provide an extended depth of field (EDOF) image that is substantially focused throughout a larger depth of field than the imaging system provides at a single focal position.

13. The machine vision inspection system of claim 12, wherein the intensity variation comprises an intensity on/off cycle synchronized with the periodically modulated focus position, wherein the intensity is on only during a more linear portion of the periodically modulated focus position.

14. The machine vision inspection system of claim 12, wherein the processing element configured to process the first preliminary image to remove blurred image contributions comprises a signal processor configured to deconvolve image data corresponding to the first preliminary image using a predetermined function that characterizes the imaging system, to provide the EDOF image.

15. The machine vision inspection system of claim 12, wherein:

the imaging system comprises an optical filter located to receive and spatially filter preliminary image light from the TAG lens; and the processing element configured to process the first preliminary image comprises the optical filter arranged to receive and spatially filter the preliminary image light from the TAG lens and output resulting filtered image light to provide the EDOF image.

16. The machine vision inspection system of claim 12, further comprising a display, wherein the machine vision inspection system is configured to display the provided EDOF image on the display of the machine vision inspection system.

17. The machine vision inspection system of claim 12, wherein the imaging system is configured such that the focus position may be fixed, and the machine vision inspection system furthermore is configured to include a controller configuration wherein:

the controller configuration controls the imaging system to provide a fixed focus position;

the controller configuration controls the machine vision inspection system to expose a measurement image using the imaging system with the fixed focus position; and the controller configuration controls processing of the measurement image to provide a measurement of the workpiece.

* * * * *